(12) United States Patent
Paolini, Jr. et al.

(10) Patent No.: US 11,934,049 B2
(45) Date of Patent: *Mar. 19, 2024

(54) SWITCHING FIBERS FOR TEXTILES

(71) Applicant: E Ink Corporation, Billerica, MA (US)

(72) Inventors: Richard J. Paolini, Jr., Framingham, MA (US); Jay William Anseth, Canton, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/973,653

(22) Filed: Oct. 26, 2022

(65) Prior Publication Data

US 2023/0044551 A1 Feb. 9, 2023

Related U.S. Application Data

(60) Division of application No. 16/851,175, filed on Apr. 17, 2020, now Pat. No. 11,635,640, which is a
(Continued)

(51) Int. Cl.
*G02F 1/01* (2006.01)
*D01F 8/04* (2006.01)
(Continued)

(52) U.S. Cl.
CPC .............. *G02F 1/0115* (2013.01); *D01F 8/04* (2013.01); *D03D 15/283* (2021.01);
(Continued)

(58) Field of Classification Search
CPC ....... G02F 1/0115; D01F 8/04; D03D 15/283; D03D 15/547; D10B 2401/20; D10B 2401/16
See application file for complete search history.

(56) References Cited

U.S. PATENT DOCUMENTS 3,852,401 A   12/1974  Suzuki et al.
4,251,250 A * 2/1981  Aulich ................ C03C 25/105
                                                      65/435
(Continued)

FOREIGN PATENT DOCUMENTS

CN        1807707 A    7/2006
CN      101070672 A   11/2007
(Continued)

OTHER PUBLICATIONS

Rein et al., Diode fibres for fabric-based optical communications. Nature 560, 214-218 (2018). https://doi.org/10.1038/s41586-018-0390-x (Year: 2018).*
(Continued)

*Primary Examiner* — Peter Radkowski
(74) *Attorney, Agent, or Firm* — Brian D. Bean

(57) ABSTRACT

A method of forming a color-changing fiber that can be incorporated into fabrics and other woven materials. The color changing fibers include an annular wall and a conductive wire axially extending through the annular wall, a core strand surrounded by the annular wall and extending axially through a central portion of the fiber, and an encapsulated electro-optic medium disposed on a surface of the core strand.

2 Claims, 4 Drawing Sheets

Related U.S. Application Data continuation-in-part of application No. 16/585,218, filed on Sep. 27, 2019, now Pat. No. 11,656,525.

(60) Provisional application No. 62/835,660, filed on Apr. 18, 2019, provisional application No. 62/739,684, filed on Oct. 1, 2018.

(51) Int. Cl.
*D03D 15/283* (2021.01)
*D03D 15/547* (2021.01)

(52) U.S. Cl.
CPC ........ *D03D 15/547* (2021.01); *D10B 2401/16* (2013.01); *D10B 2401/20* (2013.01)

(56) References Cited

U.S. PATENT DOCUMENTS

| | | |
|---|---|---|
| 4,659,619 A | 4/1987 | Tate |
| 4,756,958 A | 7/1988 | Bryant et al. |
| 4,815,355 A | 3/1989 | Cavaness |
| 4,917,920 A | 4/1990 | Ono et al. |
| 5,760,761 A | 6/1998 | Sheridon |
| 5,777,782 A | 7/1998 | Sheridon |
| 5,808,783 A | 9/1998 | Crowley |
| 5,961,804 A | 10/1999 | Jacobson et al. |
| 6,017,584 A | 1/2000 | Albert et al. |
| 6,054,071 A | 4/2000 | Mikkelsen, Jr. |
| 6,055,091 A | 4/2000 | Sheridon et al. |
| 6,072,619 A | 6/2000 | Kiryuschev et al. |
| 6,097,531 A | 8/2000 | Sheridon |
| 6,120,588 A | 9/2000 | Jacobson |
| 6,120,839 A | 9/2000 | Comiskey et al. |
| 6,128,124 A | 10/2000 | Silverman |
| 6,137,467 A | 10/2000 | Sheridon et al. |
| 6,147,791 A | 11/2000 | Sheridon |
| 6,241,921 B1 | 6/2001 | Jacobson et al. |
| 6,262,706 B1 | 7/2001 | Albert et al. |
| 6,262,833 B1 | 7/2001 | Loxley et al. |
| 6,300,932 B1 | 10/2001 | Albert |
| 6,301,038 B1 | 10/2001 | Fitzmaurice et al. |
| 6,323,989 B1 | 11/2001 | Jacobson et al. |
| 6,377,387 B1 | 4/2002 | Duthaler et al. |
| 6,515,649 B1 | 2/2003 | Albert et al. |
| 6,538,801 B2 | 3/2003 | Jacobson et al. |
| 6,542,284 B2 | 4/2003 | Ogawa |
| 6,580,545 B2 | 6/2003 | Morrison et al. |
| 6,652,075 B2 | 11/2003 | Jacobson |
| 6,693,620 B1 | 2/2004 | Herb et al. |
| 6,721,083 B2 | 4/2004 | Jacobson et al. |
| 6,727,881 B1 | 4/2004 | Albert et al. |
| 6,756,120 B2 | 6/2004 | Smith et al. |
| 6,822,782 B2 | 11/2004 | Honeyman et al. |
| 6,866,760 B2 | 3/2005 | Paolini, Jr. et al. |
| 6,870,657 B1 | 3/2005 | Fitzmaurice et al. |
| 6,870,661 B2 | 3/2005 | Pullen et al. |
| 6,922,276 B2 | 7/2005 | Zhang et al. |
| 6,950,220 B2 | 9/2005 | Abramson et al. |
| 6,982,178 B2 | 1/2006 | LeCain et al. |
| 7,002,728 B2 | 2/2006 | Pullen et al. |
| 7,006,063 B2 | 2/2006 | Maeda |
| 7,012,600 B2 | 3/2006 | Zehner et al. |
| 7,012,735 B2 | 3/2006 | Honeyman |
| 7,038,655 B2 | 5/2006 | Herb et al. |
| 7,072,095 B2 | 7/2006 | Liang et al. |
| 7,075,502 B1 | 7/2006 | Drzaic et al. |
| 7,116,318 B2 | 10/2006 | Amundson et al. |
| 7,144,942 B2 | 12/2006 | Zang et al. |
| 7,170,670 B2 | 1/2007 | Webber |
| 7,173,752 B2 | 2/2007 | Doshi et al. |
| 7,180,649 B2 | 2/2007 | Morrison et al. |
| 7,230,750 B2 | 6/2007 | Whitesides et al. |
| 7,230,751 B2 | 6/2007 | Whitesides et al. |
| 7,236,290 B1 | 6/2007 | Zhang et al. |
| 7,236,291 B2 | 6/2007 | Kaga et al. |
| 7,247,379 B2 | 7/2007 | Pullen et al. |
| 7,312,784 B2 | 12/2007 | Baucom et al. |
| 7,312,916 B2 | 12/2007 | Pullen et al. |
| 7,321,459 B2 | 1/2008 | Masuda et al. |
| 7,339,715 B2 | 3/2008 | Webber et al. |
| 7,342,068 B2 | 3/2008 | Klingenberg et al. |
| 7,375,875 B2 | 5/2008 | Whitesides et al. |
| 7,411,719 B2 | 8/2008 | Paolini, Jr. et al. |
| 7,411,720 B2 | 8/2008 | Honeyman et al. |
| 7,420,549 B2 | 9/2008 | Jacobson et al. |
| 7,453,445 B2 | 11/2008 | Amundson |
| 7,531,235 B2 | 5/2009 | Den Toonder et al. |
| 7,532,388 B2 | 5/2009 | Whitesides et al. |
| 7,535,624 B2 | 5/2009 | Amundson et al. |
| 7,579,078 B2 | 8/2009 | Hartmann et al. |
| 7,679,814 B2 | 3/2010 | Paolini, Jr. et al. |
| 7,715,088 B2 | 5/2010 | Liang et al. |
| 7,746,544 B2 | 6/2010 | Comiskey et al. |
| 7,839,564 B2 | 11/2010 | Whitesides et al. |
| 7,848,006 B2 | 12/2010 | Wilcox et al. |
| 7,903,319 B2 | 3/2011 | Honeyman et al. |
| 8,009,348 B2 | 8/2011 | Zehner et al. |
| 8,018,640 B2 | 9/2011 | Whitesides et al. |
| 8,047,681 B2 | 11/2011 | Howng et al. |
| 8,107,153 B2 | 1/2012 | Sotzing et al. |
| 8,115,729 B2 | 2/2012 | Danner et al. |
| 8,199,395 B2 | 6/2012 | Whitesides et al. |
| 8,207,511 B2 | 6/2012 | Bortz et al. |
| 8,270,064 B2 | 9/2012 | Feick et al. |
| 8,282,232 B2 | 10/2012 | Hsu et al. |
| 8,305,341 B2 | 11/2012 | Arango et al. |
| 8,319,759 B2 | 11/2012 | Jacobson et al. |
| 8,390,918 B2 | 3/2013 | Wilcox et al. |
| 8,446,664 B2 | 5/2013 | Chen et al. |
| 8,582,196 B2 | 11/2013 | Walls et al. |
| 8,593,718 B2 | 11/2013 | Comiskey et al. |
| 8,769,836 B2 | 7/2014 | Donovan et al. |
| 9,244,326 B2 | 1/2016 | Zhou et al. |
| 9,279,906 B2 | 3/2016 | Kang |
| 9,366,935 B2 | 6/2016 | Du et al. |
| 9,372,380 B2 | 6/2016 | Du et al. |
| 9,441,122 B2 | 9/2016 | Zhou et al. |
| 9,478,535 B2 | 10/2016 | Yamazaki et al. |
| 9,529,240 B2 | 12/2016 | Paolini, Jr. et al. |
| 9,633,579 B2 | 4/2017 | McLeod et al. |
| 9,726,957 B2 | 8/2017 | Telfer et al. |
| 9,733,541 B2 | 8/2017 | Shuto et al. |
| 9,777,201 B2 | 10/2017 | Widger et al. |
| 9,863,920 B2 | 1/2018 | Gaynor et al. |
| 9,921,451 B2 | 3/2018 | Telfer et al. |
| 10,151,955 B2 | 12/2018 | Paolini, Jr. et al. |
| 10,174,232 B2 | 1/2019 | Bzowej et al. |
| 10,372,008 B2 | 8/2019 | Telfer et al. |
| 10,444,553 B2 | 10/2019 | Laxton |
| 2001/0009352 A1 | 7/2001 | Moore |
| 2003/0194578 A1 | 10/2003 | Tam et al. |
| 2005/0012980 A1 | 1/2005 | Wilcox et al. |
| 2007/0197115 A1 | 8/2007 | Eves et al. |
| 2008/0156657 A1 | 7/2008 | Butterfield et al. |
| 2008/0316580 A1 | 12/2008 | Gillies et al. |
| 2009/0009852 A1 | 1/2009 | Honeyman et al. |
| 2009/0206499 A1 | 8/2009 | Whitesides |
| 2009/0225398 A1 | 9/2009 | Duthaler et al. |
| 2010/0148385 A1 | 6/2010 | Balko et al. |
| 2011/0073353 A1 | 3/2011 | Lee et al. |
| 2012/0274616 A1 | 11/2012 | Scribner et al. |
| 2014/0011913 A1 | 1/2014 | Du et al. |
| 2014/0093731 A1 | 4/2014 | Bonfiglio et al. |
| 2015/0005720 A1 | 1/2015 | Zang et al. |
| 2015/0015932 A1* | 1/2015 | Telfer .............. G02F 1/1676 359/296 |
| 2016/0012710 A1 | 1/2016 | Lu et al. |
| 2018/0271180 A1 | 9/2018 | Kim, II et al. |
| 2018/0363173 A1 | 12/2018 | Keating et al. |
| 2018/0364518 A1 | 12/2018 | Paolini, Jr. et al. |
| 2019/0146299 A1 | 5/2019 | Kaino et al. |
| 2020/0103720 A1 | 4/2020 | Anseth et al. |

(56) References Cited

U.S. PATENT DOCUMENTS

FOREIGN PATENT DOCUMENTS

| CN | 105261423 | A | 1/2016 |
|---|---|---|---|
| CN | 106705829 | A | 5/2017 |
| JP | 2004070206 | A | 3/2004 |
| JP | 2010238646 | A | 10/2010 |
| KR | 20180013007 | A1 | 7/2018 |
| TW | 200916620 | A | 4/2009 |
| TW | 201211339 | A | 3/2012 |
| TW | M531957 | U | 11/2016 |

OTHER PUBLICATIONS

Kaufman et al., User-Controlled Color-Changing Textiles: From Prototype to Mass Production, Open Science Index, Materials and Textile Engineering vol. 12, No. 08, 2018 publications.waset.org/abstracts/83592/pdf (Year: 2018).*

Khudiyev, T., Hou, C., Stolyarov, A.M., Fink, Y. "Sub-Micrometer Surface-Patterned Ribbon Fibers and Textiles," Advanced Materials, DOI: 10.1002/adma.201605868, Mar. 2017. (Year: 2017).*

Takahashi, Dean, This amazing fabric can change its color on demand, May 15, 2018, https://venturebeat.com/business/this-amazing-fabric-can-change-its-color-on-demand/ (Year: 2018).*

Wood, D., "An Electrochromic Renaissance?" Information Display, 18(3), 24 (Mar. 2002).

O'Regan, B. et al., "A Low Cost, High-efficiency Solar Cell Based on Dye-sensitized colloidal TiO2 Films", Nature, vol. 353, pp. 737-740 (Oct. 24, 1991).

Bach, Udo et al., "Nanomaterials-Based Electrochromics for Paper-Quality Displays", Adv. Mater, vol. 14, No. 11, pp. 845-848, (Jun. 5, 2002).

Hayes, R.A. et al., "Video-Speed Electronic Paper Based on Electrowetting", Nature, vol. 425, No. 25, pp. 383-385 (Sep. 2003).

Kitamura, T. et al., "Electrical toner movement for electronic paper-like display", Asia Display/IDW '01, pp. 1517-1520, Paper HCS1-1 (2001).

Yamaguchi, Y. et al., "Toner display using insulative particles charged triboelectrically", Asia Display/IDW '01, pp. 1729-1730, Paper AMD4-4 (2001).

European Patent Office, PCT/US2018/036772, International Search Report and Written Opinion, dated Sep. 19, 2018.

Korean Intellectual Property Office, PCT/US2019/053388, International Search Report and Written Opinion, dated Jan. 16, 2020.

Kaufman, J. et al. "User-Controlled Color-Changing Textiles: From Prototype to Mass Production", International Journal of Materials and Textile Engineering, vol. 12, No. 8. (2018).

Rein, M. et al. "Diode fibres for fabric-based optical communications", Nature, vol. 560, pp. 214-218 (2018).

Khudiyev, T. et al. "Sub-Micrometer Surface-Patterned Ribbon Fibers and Textiles", Advanced Materials, vol. 29, No. 1605868, (2017).

* cited by examiner

SWITCHING FIBERS FOR TEXTILES

RELATED APPLICATIONS

This application is a divisional of U.S. patent application Ser. No. 16/851,175, filed Apr. 17, 2020 (published as U.S. Patent Publication No. 2020/0241330), which is a continuation-in-part of U.S. patent application Ser. No. 16/585,218, filed Sep. 27, 2019 (published as U.S. Patent Publication No. US2020/0103720), which claims priority to U.S. Provisional Patent Application No. 62/739,684, filed Oct. 1, 2018. This application additionally claims priority to U.S. Provisional Patent Application No. 62/835,660, filed Apr. 18, 2019. All patents, patent applications, and references disclosed herein are incorporated by reference in their entireties.

BACKGROUND OF INVENTION

There are many applications for clothing that can change on demand. If modern fabrics were able to change color on demand, a consumer could dramatically reduce the number of articles of clothing that he or she purchased in a lifetime. It would no longer be necessary to have, for example, three different blouses of nearly identical cut but different color. The consumer could simply chose the color (or pattern) needed depending upon the event, season, etc. In this way, color changing fabrics could greatly reduce the environmental impact of clothing. Additionally, replacing these clothes with each new fashion season is resource-intensive—regardless of the source of the fabric, e.g., cotton, wool, or petrochemicals. Other applications for color changing clothing include camouflage and sportswear. For example, a baseball team would no longer require two different uniforms, the color could be changed depending upon whether the team was home or away.

A variety of technologies have been identified for creating fabrics that are able to reversibly change colors. These technologies include thermochromic dyes, which change color when exposed to different temperatures, photochromic dyes, which change color when exposed to sunlight, integrated LEDs, which can be illuminated on demand by providing power to the diodes, and liquid crystal inks, which allow different colors to be shown (or not) with the presence of a supplied electric field. These technologies have been highlighted in various prototypes, but only the thermochromic dyes have been widely incorporated into clothing. See "Hypercolor" t-shirts sold by Generra Sportswear. However, because the thermochromic clothing is heat sensitive, the color patterns are variable. For example, the underarms of a t-shirt having thermochromic ink may be consistently a different shade, drawing attention to that area.

One proposed solution is forming a hollow fiber that is subsequently filled with an electro-optic medium, such as an electro-phoretic medium, as is disclosed in U.S. Patent Application Publication No. 2018/0364518. The fiber may be prepared by using a syringe, for example, to fill an extruded hollow fiber that has conductive wire electrodes imbedded lengthwise with a liquid electro-optic medium comprising electrophoretically active pigment particles dispersed in a non-polar solvent. However, some of the disadvantages associated with this proposed fiber include undesired pigment settling, difficulties in filling appreciable lengths of fiber whose hollow cavity dimension is less than 200 microns, and inability to cut the fiber to different lengths without compromising the function of the entire fiber as a result of dispersion leaking out of the hollow fiber's internal cavity.

Thus, there still remains a need for inexpensive and robust fabrics that can change color on demand.

SUMMARY OF INVENTION

The invention overcomes the shortcomings of the prior art by providing flexible fibers that can be switched between colors on demand that are more mechanically robust. The fibers may be incorporated into fabrics by weaving, knitting, embroidering, thermoforming, or matting. The fibers can be incorporated into other materials to achieve strength, breathability, or stretch as demanded by the application. When a suitable electric field is provided, the color of the fiber will switch. Because the pigments are bistable, it is not necessary to provide constant power to maintain the color state. Rather, once the fabric is switched, it is stable for long periods of time, e.g., days or weeks.

Accordingly, in one aspect, a flexible color-changing fiber may comprise an annular wall and a conductive wire axially extending through the annular wall, a core strand surrounded by the annular wall and extending axially through a central portion of the fiber, and an encapsulated electro-optic medium disposed on a surface of the core strand. The electro-optic medium may be bistable and comprise a non-polar solvent and one or more sets of charged pigment particles.

In another aspect, a method of making a flexible color-changing fiber may comprise coating at least a portion of a surface of a core strand with an encapsulated electro-optic medium, inserting the coated core strand through a preform, inserting a conductive wire through the preform, and drawing down the preform to form a fiber comprising an annular wall, such that the conductive wire extends axially through the annular wall and the core strand extends axially through a central portion of the fiber.

The creation of fibers containing bistable electronic ink and the subsequent incorporation of the fibers into fabrics and apparel, etc., would enable switching of the fabrics and then disconnecting them from electronics because the display is stable with no power. Accordingly, the drive electronics would not have to be integrated into the fabric unless mobile switching was desired. Thus, in some embodiments, a switching box, which could be battery powered, is a detachable accessory. The lack of driving electronics greatly simplifies laundering the fibers while also increasing durability. If it is desirable to have the device changing actively while worn, the switching electronics could be included in the garment but would only have to be turned on for brief periods during the updates.

These and other aspects of the present invention will be apparent in view of the following description.

BRIEF DESCRIPTION OF DRAWINGS

The drawing Figures depict one or more implementations in accord with the present concepts, by way of example only, not by way of limitations. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details.

The invention provides flexible color-changing fibers that can be incorporated into textiles and other materials. The ability to include electronic components into the fiber, i.e., wire electrodes, is useful for attaining a practical and economical fiber based display. For example, referring to FIG. 1A, a schematic cross-sectional view of a color-changing fiber according to first embodiment of the invention is provided.

Figure 1A:
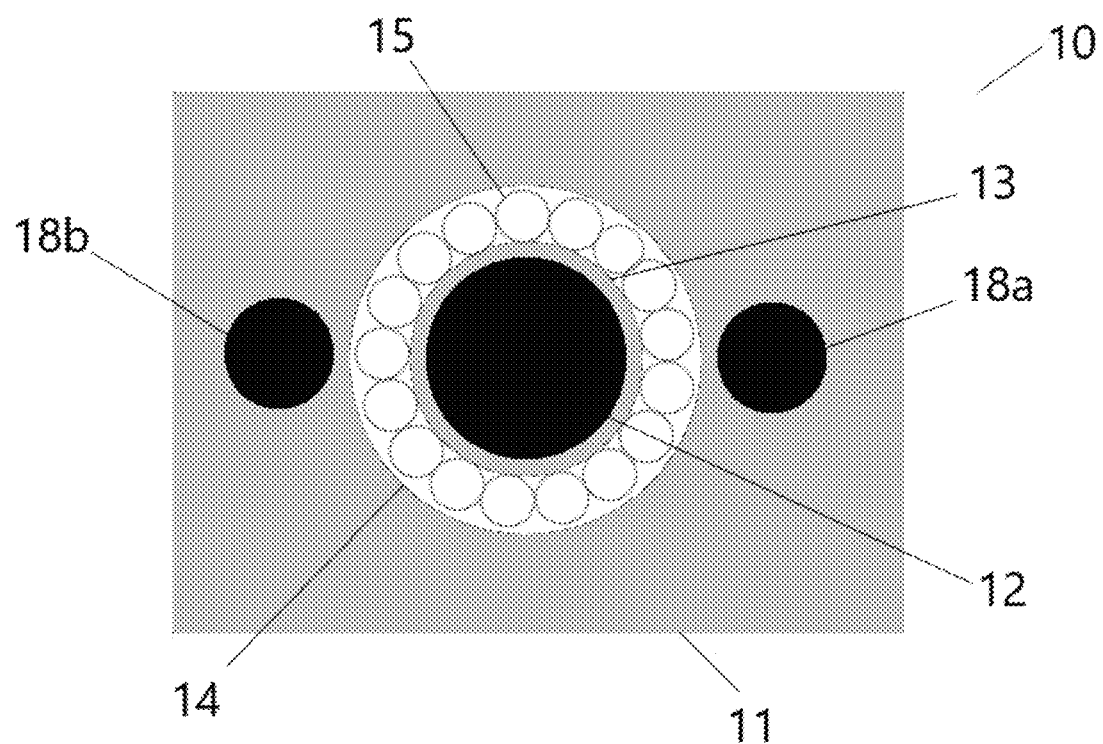
FIG. 1A is a schematic cross-sectional view of a flexible color-changing fiber according to a first embodiment of the present invention.

As illustrated in FIG. 1A, the color-changing fiber 10 comprises a light-transmissive annular wall having a substantially rectangular cross-section and a coated core strand 12 extending coaxially through a central portion of the fiber 10. In some embodiments, the fiber has a substantially rectangular cross-section and the inner core strand has a substantially circular cross-section. However, other cross-sectional shapes for the annular wall and central core strand are also possible, such as an ovoid. The rectangular cross section may have sharp edges, as shown in FIG. 1A, or the corners may be slightly rounded. The annular wall of the color changing fibers may be made of various polymers, most preferably a light-transmissive thermoplastic. Examples of polymers include, but are not limited to, polycarbonate, poly(methyl methacrylate), polyethylene terephthalate, amorphous copolyester, polyvinyl chloride, liquid silicone rubber, cyclic olefin copolymers, polyethylene, ionomer resins, polypropylene, fluorinated ethylene propylene, styrene methyl methacrylate, styrene acrylonitrile resin, polystyrene, and methyl methacrylate acrylonitrile butadiene styrene.

The thickness of the central core strand 12 is selected so that a large enough outer surface area is provided to facilitate coating the outer surface of the core strand 12 with an electro-optic medium 14, but not too large as to result in a stiff fiber that will be difficult for fabric weaving. The core strand 12 is made from a conductive material, preferably one or more metals or other conductive material with good ductility. Exemplary materials include, but are not limited to, tungsten, copper, nickel, aluminum, stainless steel, gold, silver, alloys thereof, and combinations thereof. Alloys of the aforementioned conductive metals may also be incorporated in the core strand. The conductive metal(s) may also be plated onto the surface of a non-conductive or conductive substrate to form the core strand, for example. A larger thickness for the central core strand will also facilitate aggressive cleaning of the wire in order to expose the wire for electrical connections to a power source and/or controller, for example. Preferably, the central core strand has a thickness greater than or equal to about 20 microns and less than or equal to about 250 microns.

Prior to the application of the electro-optic medium, at least a portion of the outer circumferential surface of the central core strand 12 is preferably coated with a layer of semi-conductive material 13. The layer of semi-conductive material may be provided in the form of an annular coating having a thickness from about 5 microns to about 200 microns, preferably to about 50 microns, wherein the thickness is preferably measured between the core strand 12 and the electro-optic medium 14. The semi-conductive material 13 preferably comprises a doped polymeric material. The composition and thickness of the semi-conductive material is selected, such that the semi-conductive material provides for electrical driving signals across the full circumferential area of the electro-optic medium between core strand 12 and the conductive wires 18a, 18b, described in greater detail below. This phenomenon is also known as "blooming" whereby the area of the electro-optic layer which changes optical state in response to a change of voltage is larger than the area of the electrode, in this example, the cross-sectional area through the diameter of the conductive wires 18a, 18b. To promote blooming, an optional layer of light-transmissive semi-conductive material (not shown) may also be applied to at least a portion of the outer circumferential surface of the electro-optic medium 14. The term "light-transmissive" is used herein to mean that the layer thus designated transmits sufficient light to enable an observer, looking through that layer, to observe the change in optical states of the electro-optic medium; in cases where the electro-optic medium displays a change in reflectivity at non-visible wavelengths, the term "light-transmissive" should of course be interpreted to refer to transmission of the relevant non-visible wavelengths. The resistivity of the layer of semi-conductive material is preferably about 10e9 ohm-cm or less, more preferably about 10e7 ohm-cm or less, at 20° C.

Doped polymeric materials that may be used in the layer of semi-conductive material may include, but are not limited to, aliphatic or aromatic polyurethane latexes, polyacrylates, and poly(meth)acrylates containing a dopant, such as tetra-butylammonium hexafluorophosphate, 1-butyl-3-methyl-imidazolium hexafluorophosphate, polyvinylalcohol, ionically modified polyvinylalcohol, gelatin, polyvinylpyrrolidone, and combinations thereof. Polymeric blends containing aromatic isocyanates are less preferred. Examples of formulations that may be included in the layer of semi-conductive polymeric material are described in U.S. Patent Application Publication No. 2017/0088758 and U.S. Pat. Nos. 7,012,735; 7,173,752; and 9,777,201. The semi-conductive material is preferably hydrophilic, preferably water insoluble, so that the semi-conductive material is not dissolved or removed during application of the electro-optic medium, which may be applied as an aqueous slurry to the core strand.

The layer of electro-optic medium 14 applied over at least a portion of surface of the layer of semi-conductive material 13 and the central core strand 12 is preferably a solid electro-optic material. Some electro-optic materials are solid in the sense that the materials have solid external surfaces, although the materials may, and often do, have internal liquid or gas-filled spaces. Thus, the term "solid electro-optic material" may include rotating-bichromal members, encapsulated electrophoretic media, and encapsulated liquid crystal media.

Electro-optic media of a rotating bichromal member type are described, for example, in U.S. Pat. Nos. 5,808,783; 5,777,782; 5,760,761; 6,054,071 6,055,091; 6,097,531; 6,128,124; 6,137,467; and 6,147,791 (although this type of media is often referred to as a "rotating bichromal ball," the term "rotating bichromal member" is preferred as more accurate since in some of the patents mentioned above the rotating members are not spherical). Such media uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the material is changed by applying an electric field thereto, thus rotating the bodies to various positions and varying which of the sections of the bodies is seen through a viewing surface. This type of electro-optic medium is typically bistable.

The terms "bistable" and "bistability" are used herein in their conventional meaning in the art to refer to electro-optic materials having first and second states differing in at least one optical property, and such that after the electro-optic material has been driven, by means of an addressing pulse of finite duration, to assume either its first or second state, after the addressing pulse has terminated, that state will persist for at least several times, for example at least four times, the minimum duration of the addressing pulse required to change the state of the electro-optic material. It is shown in U.S. Pat. No. 7,170,670 that some particle-based electrophoretic materials capable of gray scale are stable not only in their extreme black and white states but also in their intermediate gray states, and the same is true of some other types of electro-optic media. This type of media is properly called "multi-stable" rather than bistable, although for convenience the term "bistable" may be used herein to cover both bistable and multi-stable media.

The term "gray state" is used herein in its conventional meaning in the imaging art to refer to a state intermediate two extreme optical states, and does not necessarily imply a black-white transition between these two extreme states. For example, several of the E Ink patents and published applications referred to below describe electrophoretic material in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a material, and should be understood as normally including extreme optical states which are not strictly black and white, for example the aforementioned white and dark blue states. The term "monochrome" may be used hereinafter to denote a drive scheme which only drives electro-optic media to their two extreme optical states with no intervening gray states.

Another type of electro-optic media uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic media may be found in electro-wetting displays developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting media can be made bistable.

One type of electro-optic media, which has been the subject of intense research and development for a number of years, is the particle-based electrophoretic media, in which a plurality of charged particles move through a fluid under the influence of an electric field. Electrophoretic media can have attributes of good brightness and contrast, wide viewing angles, state bistability, and low power consumption when compared with liquid crystal displays.

As noted above, electrophoretic media require the presence of a fluid. In most prior art electrophoretic media, this fluid is a liquid, but electrophoretic media can be produced using gaseous fluids; see, for example, Kitamura. T., et al., "Electrical toner movement for electronic paper-like display", IDW Japan, 2001, Paper HCS1-1, and Yarnaguchi, Y., et al., "Toner display using insulative particles charged triboelectrically", IDV Japan, 2001, Paper AMD4-4). See also U.S. Pat. Nos. 7,321,459 and 7,236,291.

Numerous patents and applications assigned to or in the names of the Massachusetts Institute of Technology (MIT), E Ink Corporation, E Ink California, LLC. and related companies describe various technologies used in encapsulated electrophoretic and other electro-optic media. Encapsulated electrophoretic media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Films and sub-assemblies containing electro-optic materials; see for example U.S. Pat. Nos. 6,982,178 and 7,839,564;

(d) Backplanes, adhesive layers and other auxiliary layers and methods used in displays; see for example U.S. Pat. Nos. 7,116,318 and 7,535,624;

(e) Color formation and color adjustment; see for example U.S. Pat. Nos. 7,075,502 and 7,839,564;

(f) Methods for driving displays; see for example U.S. Pat. Nos. 7,012,600 and 7,453,445; and (g) Applications of displays; see for example U.S. Pat. Nos. 7,312,784 and 8,009,348.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

Encapsulated electrophoretic media typically does not suffer from clustering and settling failure and provides further advantages, such as the ability to print or coat the media on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating;

silk screen printing processes; electrostatic printing processes; thermal printing processes; ink jet priming processes; electrophoretic deposition (See U.S. Pat. No. 7,339, 715); and other similar techniques.) Further, because the medium can be printed (using a variety of methods), an application utilizing the medium can be made inexpensively.

It is preferred that the electro-optic media used in the various embodiments of the present invention is provided in the form of microencapsulated electrophoretic media. For example, referring again to FIG. 1A, a layer of electro-optic medium 14 comprising a plurality of capsules 15 containing a dispersion of charged pigment particles in a solvent may be coated as an annular coating around the central core strand 12. The annular coating may have a thickness greater than or equal to about 10 microns, preferably about 15 microns, more preferably about 20 microns, and less than or equal to about 250 microns, preferably about 100 microns, more preferably about 75 microns, and most preferably about 50 microns. The microcapsule coating may be provided, for example, in the form of an aqueous coating slurry formulation comprising a microencapsulated dispersion of electrophoretic particles and a binder. The binder material may include, but is not limited to, an aqueous polymeric latex dispersion or water-soluble polymer solutions (e.g., polyvinyl alcohol, such as Kuraray Poval® CM-318, fish gelatin, and alginate). The slurry formulation may further comprises one or more additives, such as hydropropyl methyl cellulose, surfactants (e.g. Triton X-100), and co-solvents (e.g. butanol).

The charged pigment particles may be of a variety of colors and compositions. Additionally, the charged pigment particles may be functionalized with surface polymers to improve state stability. Such pigments are described in U.S. Patent Publication No. 2016/0085132, which is incorporated by reference in its entirety. For example, if the charged particles are of a white color, they may be formed from an inorganic pigment such as $TiO_2$, $ZrO_2$, ZnO, $Al_2O_3$, $Sb_2O_3$, $BaSO_4$, $PbSO_4$ or the like. They may also be polymer particles with a high refractive index (>1.5) and of a certain size (>100 nm) to exhibit a white color, or composite particles engineered to have a desired index of refraction. Black charged particles, they may be formed from CI pigment black 26 or 28 or the like (e.g., manganese ferrite black spinel or copper chromite black spinel) or carbon black. Other colors (non-white and non-black) may be formed from organic pigments such as CI pigment PR 254, PR122, PR149, PG36, PG58, PG7, PB28, PB15:3, PY83, PY138, PY150, PY155 or PY20. Other examples include Clariant Hostaperm Red D3G 70-EDS, Hostaperm Pink E-EDS, PV fast red D3G, Hostaperm red D3G 70, Hostaperm Blue B2G-EDS, Hostaperm Yellow H4G-EDS, Novoperm Yellow HR-70-EDS, Hostaperm Green GNX, BASF Irgazine red L 3630, Cinquasia Red L 4100 HD, and Irgazin Red L 3660 HD; Sun Chemical phthalocyanine blue, phthalocyanine green, diarylide yellow or diarylide AAOT yellow. Color particles can also be formed from inorganic pigments, such as CI pigment blue 28, CI pigment green 50, CI pigment yellow 227, and the like. The surface of the charged particles may be modified by known techniques based on the charge polarity and charge level of the particles required, as described in U.S. Pat. Nos. 6,822,782, 7,002, 728, 9,366,935, and 9,372,380 as well as US Publication No. 2014-0011913, the contents of all of which are incorporated herein by reference in their entirety.

The particles may exhibit a native charge, or may be charged explicitly using a charge control agent, or may acquire a charge when suspended in a solvent or solvent mixture. Suitable charge control agents are well known in the art; they may be polymeric or non-polymeric in nature or may be ionic or non-ionic. Examples of charge control agent may include, but are not limited to, Solsperse 17000 (active polymeric dispersant), Solsperse 9000 (active polymeric dispersant), OLOA 11000 (succinimide ashless dispersant), Unithox 750 (ethoxyl ales), Span 85 (sorbitan trioleate), Petronate L (sodium sulfonate), Alcolec LV30 (soy lecithin), Petrostep B100 (petroleum sulfonate) or B70 (barium sulfonate), Aerosol OT, polyisobutylene derivatives or polyethylene co-butylene) derivatives, and the like. In addition to the suspending fluid and charged pigment particles, internal phases may include stabilizers, surfactants and charge control agents. A stabilizing material may be adsorbed on the charged pigment particles when they are dispersed in the solvent. This stabilizing material keeps the particles separated from one another. As is known in the art, dispersing charged particles (typically a carbon black, as described above) in a solvent of low dielectric constant may be assisted by the use of a surfactant. Such a surfactant typically comprises a polar "head group" and a non-polar "tail group" that is compatible with or soluble in the solvent. In the present invention, it is preferred that the non-polar tail group be a saturated or unsaturated hydrocarbon moiety, or another group that is soluble in hydrocarbon solvents, such as for example a poly(dialkylsiloxane). The polar group may be any polar organic functionality, including ionic materials such as ammonium, sulfonate or phosphonate salts, or acidic or basic groups. Particularly preferred head groups are carboxylic acid or carboxylate groups. Stabilizers suitable for use with the invention include polyisobutylene and polystyrene. In some embodiments, dispersants, such as polyisobutylene succinimide and/or sorbitan trioleate, and/or 2-hexyldecanoic acid are added.

Embedded within the annular wall 11 of the color changing fiber 10 are two conductive wires 18a, 18b. The conductive wires 18a, 18b, similar to the core strand 12, preferably comprise one or more metals or other conductive materials having good ductility that include, but are not limited to, tungsten, copper, nickel, aluminum, stainless steel, gold, silver, alloys thereof, and combinations thereof. Various embodiments of the present invention may include only a single conductive wire embedded in the annular wall of the color changing fiber; however, it is preferred that at least two conductive wires, more preferably at least three conductive wires, are embedded in the annular wall.

The conductive wires 18a, 18b and core strand 12 serve as electrodes for applying an electric field across the encapsulated electro-optic medium 14. For example, if the charged pigment particles within the capsules 15 have a positive charge polarity, the pigment particles may be driven away from the core strand 12 by applying a positive voltage to the core strand 12 relative to the conductive wires 18a, 18b. This would switch the color changing fiber 10 to an optical state associated with the color of the pigment particles. The charged pigment particles alternatively may be driven towards the core strand 12 by applying a negative voltage to the core strand 12 relative to the conductive wires 18a, 18b. If the pigment particles are dispersed within a colored solvent, this would result in switching the optical state of the color changing fiber 10 to one associated with the color of the solvent. Alternatively, the dispersions within the capsules 15 may contains two sets of pigments particles having opposite charge polarities and different colors to switch the optical state of the fiber (e.g. white negatively charged particles and black positively charged particles).

Additionally, it is possible to provide levels of gray states by mixing the two pigment particles within the capsules.

It is desirable to have the fiber be thin enough for weaving into devices but thick enough to enable perceptible active switching. It is also desirable to have the annular wall of the fiber as thin as possible to maximize the optical switching volume relative to the thickness of the fiber. However, if the walls are too thin the fiber will fail, either by cracking, snapping, or by releasing one of the wire electrodes. Toward that end, it is desirable for a fiber having a rectangular cross section to be approximately 2 mm×1 mm thick, or less, with an inner cavity having a diameter of 1 mm, preferably 0.5 mm, or less. In preferred embodiments, the rectangular fiber can be about 0.8 mm×0.5 mm or less and the diameter of the internal cavity about 0.4 mm or less.

As previously noted, flexible fibers made according to some of the embodiments of the present invention include one or more conductive wire electrodes, such as conductive wires 18a, 18b in FIG. 1A, running lengthwise along the fiber as close to the electro-optic medium as possible without compromising the ability of the annular wall to mechanically restrain the electrodes. The electrodes may be formed from tungsten, silver, copper, or other conductive material with good ductility. The electrode cross-sectional shape may be round, rectangular or other shape that will optimize the uniformity of the electric field across the electro-optic medium. When the ends of the electrodes are connected to an electrical supply, an electric potential can be created across the electro-optic medium to cause a change in its optical state. The electrodes should be as small as possible while maintaining enough mechanical strength to survive the fiber making process. In some of the embodiments of this invention, the electrodes are typically 100 µm or less in diameter and preferably 50 µm or less in diameter. The fibers can be indefinitely long, for example, 1 meter or longer, e.g., 10 meters or longer, e.g., 100 meters or longer.

Figure 1B:
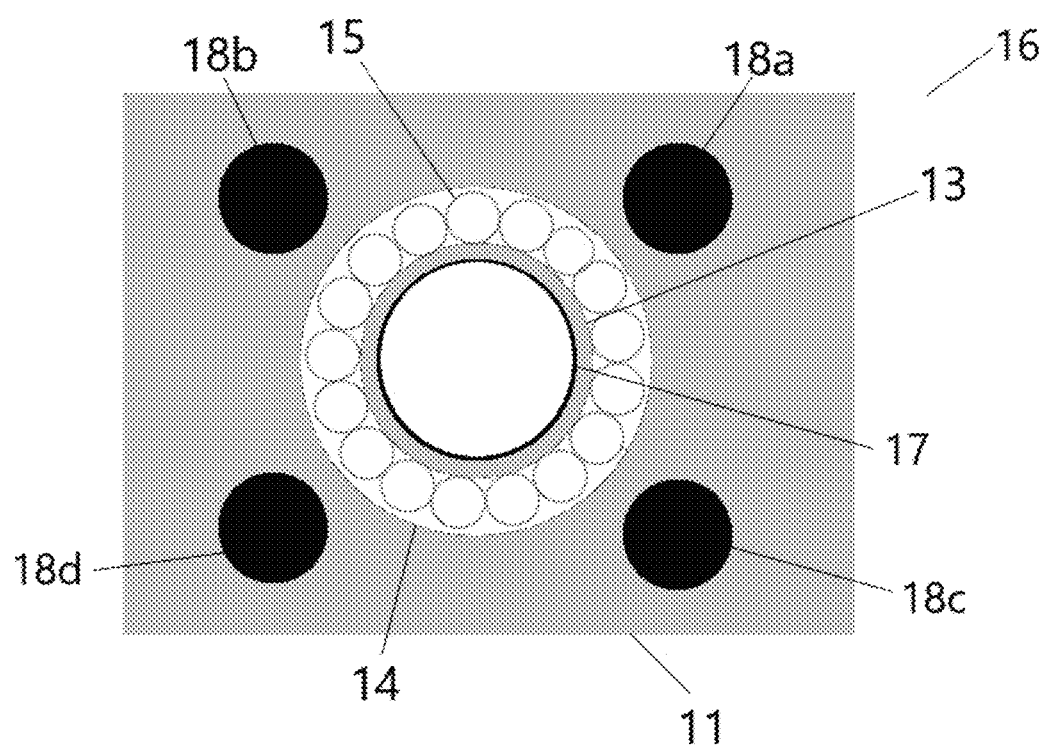
FIG. 1B is a schematic cross-sectional view of a flexible color-changing fiber according to a second embodiment of the present invention.

Referring now to FIG. 1B, a cross-sectional schematic view of a color changing fiber 16 according to a less preferred embodiment of the present invention is illustrated. The color changing fiber 16 comprises many of the same features as the first embodiment. The color changing fiber 16 comprises an annular wall 11 that may be made from a polymeric material, such as polycarbonate, and a central portion occupied by a core strand 17 having a circumferential coating of a semi-conductive material 13 and an encapsulated electro-optic medium 14. Again, an optional second coating of semi-conductive material (not show) may be applied to the outer surface of the electro-optic medium 14. The color changing fiber 16 of FIG. 1B differs from the embodiment illustrated in FIG. 1A in that the core strand 17 is non-conductive and additional conductive wires 18a, 18b, 18c, 18d are embedded in the annular wall 11 for applying an electric field to the electro-optic medium 14. The core strand 17 may be a synthetic fiber comprising a non-conductive polymer and functions as a substrate for coating the layers of semi-conductive material 13 and electro-optic medium 14. Examples of synthetic materials for the core strand include, but are not limited to, cellulosic fibers (e.g. regenerated cellulose and cellulose triacetate), polyamides (e.g. polycaprolactam and polyhexamethylene adipamide), aramids (e.g. poly-p-phenylene tereph-thalamide, poly-m-phenylene isoph-thalamide), polyesters (e.g. polyethylene terephthalate), polyolefins (e.g. polyacrylonitrile, polypropylene, polyethylene), and polyurethane.

The electric field applied to the electro-optic medium 14 may be achieved by applying a voltage between pairs of conductive wires. For example, the top pair of conductive wires 18a, 18b may have the same polarity, but opposite to the polarity of the bottom pair of conductive wires 18c, 18d. Therefore, the conductive wires 18a, 18b, 18c, 18d, may be made from one or more conductive materials, such as the conductive materials previously described. Because the color changing fiber 16 has a rectangular cross-section, it is beneficial that the cross-section is wider than deep when viewed from one side (e.g. the top or bottom side of the rectangular cross-section illustration of FIG. 1B). This creates a better ratio of active area to the inactive area, i.e. area not obscured by the conductive wires, while keeping the gap between the electrode wires smaller, thereby achieving a more homogenous electric field. Typically the ratio of width to height in cross section is of at least 1.2:1, more preferably 1.5:1, or more, when using a rectangular cross-section. The aspect ratio is also important for controlling the orientation of the fiber in products that incorporate the fiber (e.g., fabrics). For example, a fiber with a rectangular cross-section will consistently bend in one direction without rolling, allowing the fiber to be oriented so that it shows a certain face. This effect is important when the fiber includes encapsulated electrophoretic media having more than one optical state resulting in the opposite sides of the fiber having different colors.

It is preferred that the embodiment of FIG. 1B include four conductive electrode wires arranged in two sets of two wires. The wires are preferably arranged close to the electro-optic medium and toward the middle of the height of the fiber for improved uniformity of the electric field generated by the wires. The fraction of the width electro-optic medium that is obscured by opaque electrode wires is given by the formula f=N*D/W, where N is the number of wires on one side of the electro-optic medium, D is the wire diameter and W is the diameter of the central portion comprising the electro-optic medium. It is desirable for the fraction f to be less than 40% and preferably less than 20%.

Figure 2:
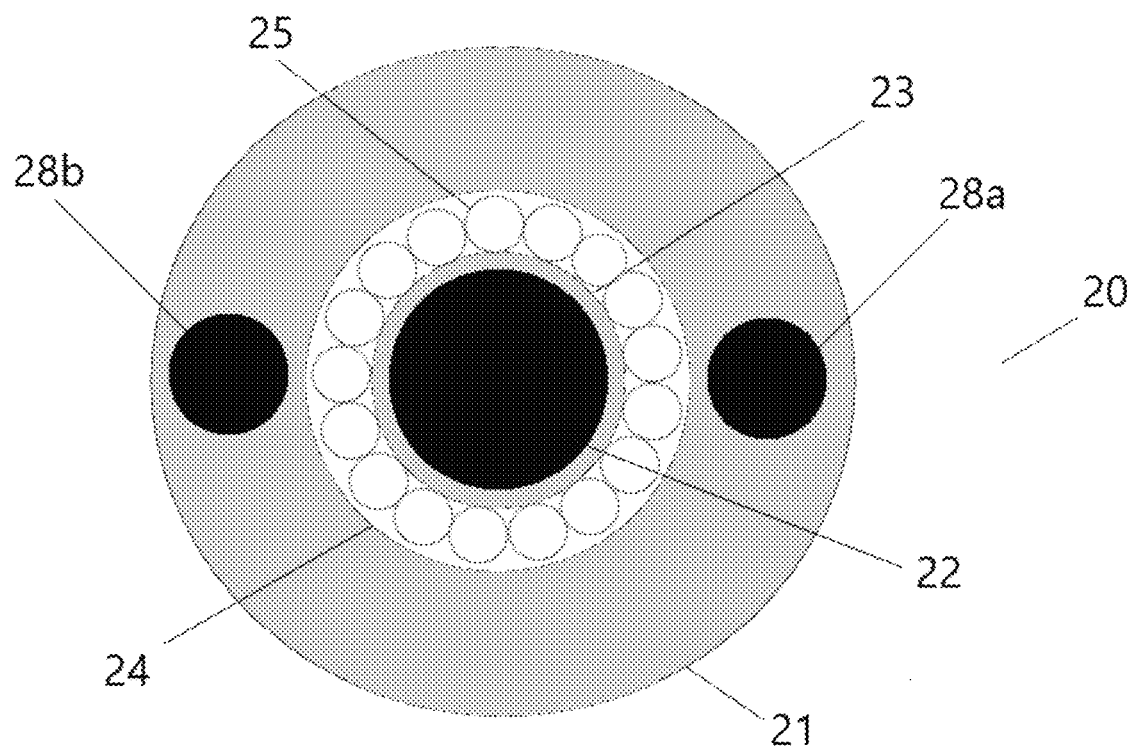
FIG. 2 is a schematic cross-sectional view of a flexible color-changing fiber according to a third embodiment of the present invention.

Referring now to FIG. 2, a color changing fiber 20 according to yet another embodiment of the present invention is illustrated. The color changing fiber of the third embodiment is essentially the same as the first embodiment except that the color changing fiber 20 has a circular cross-section. The color changing fiber 20 comprises an annular wall 21 having conductive wires 28a, 28b extending axially therethrough, as well as a core strand 22 that is also conductive extending co-axially through a central portion of the fiber 20. The outer surface of the core strand 22 is coated with a semi-conductive material 23 and an encapsulated electro-optic medium 24. The same materials previously described for the annular wall 21, conductive wires 28a, 28b, core strand 22, semi-conductive material 23, and electro-optic medium 24 may be used. Again, an optional layer of light-transmissive semiconductive material (not shown) may be applied to the outer circumferential surface of the electro-optic medium 24.

Figure 3A:
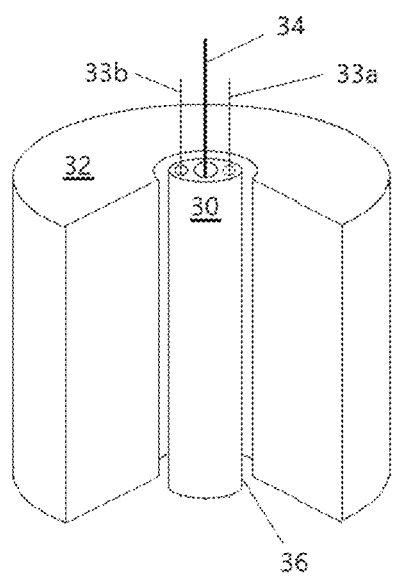
FIGS. 3A and 3B illustrate a system for making the flexible color-changing fiber of FIG. 2.
Figure 3B:
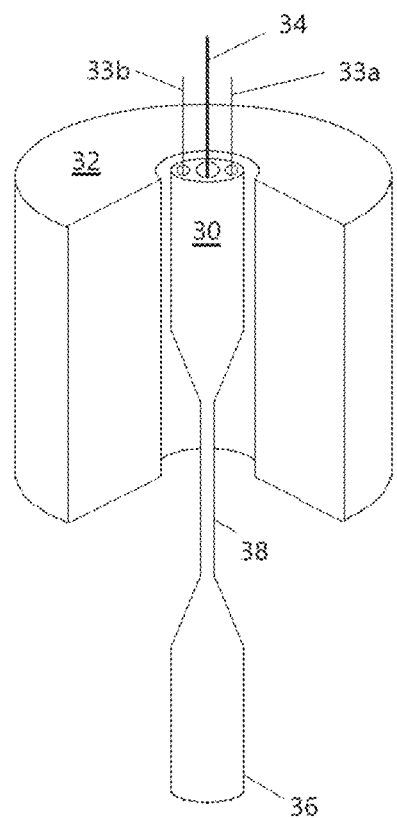

A system and method of making a color changing fiber according to the various embodiments of the present invention is illustrated in FIGS. 3A and 3B. The system comprises a heater or furnace 32 having an internal bore into which a cylindrical preform 30 is loaded. The furnace 32 is illustrated with a section removed to reveal the cylindrical preform 30 within the bore. The preform 30 is not limited to a cylindrical shape having a circular cross-section, but may, for example, be provided in the form a block having a square or rectangular cross-section or a cylinder with an oval cross-section. The preform 30 also includes a central cavity extending co-axially through the length of the preform 30, as well as one or more additional cavities extending axially through the annular wall of the preform 30. A conductive wire is inserted into each of the cavities in the annular wall of the preform 30, such as conductive wires 33a, 33b.

A coated core strand 34 is inserted through the central bore of the preform 30. Prior to insertion, the core strand 34 is coated first with a layer of semi-conductive material followed by a coating of electro-optic medium. The coated layers may be applied to the surface of the core strand via a variety of printing methods, including, but not limited to, dip coating, electrodeposition., powder coating, spray coating, or extrusion. Each layer is also preferably dried prior to inserting the coated core strand 34 into the preform 30.

Each of the conductive wires 33a, 33b and core strand 34 are attached to the distal end 36 of the preform. This may be achieved, for example, by knotting the leading end of core strand and conductive wires after insertion through the length of the preform 30 or by attaching the leading ends to the distal end 36 of the preform 30 with an adhesive or fastener. After the core strand 34 and conductive wires 33a, 33b are secured, the furnace 32 may heat the preform 30. The preform is preferably made from a polymeric material, such as polycarbonate, that will be pliable and have a high ductility upon reaching an acceptable temperature. Once heated, the distal end 36 of the preform 30 may be pulled using a draw tower or a fiber pulling system to draw down the preform 30. This causes a reduction in the dimensions of the preform within the middle drawn section 38 of the preform 30 including the diameter of the cavities extending axially through the preform, until the cross-section of the drawn section 38 has a cross-section similar to the cross-section illustrated in FIG. 2, for example. The ends of middle drawn section 38 of the preform 30 may be cut to provide the color changing fiber, and finally the fiber walls may then be ablated, stripped, or cut to make connections to the conductive wires and core strand electrodes.

By pulling a core strand having a pre-dried electro-optic medium coating through a preform, extremely difficult post-drying steps previously required for removing water from hollow fibers filled with aqueous slurries, such as those described in U.S. Patent Application Publication No. 2018/0364518, are eliminated. The various embodiments of the present invention also allow for a high capsule fill factor (that is, few capsule void regions within the fiber). Furthermore, the use of encapsulated electrophoretic media eliminates challenges associated with pigment settling, as well as allows one to cut these switchable fibers to any arbitrary length without losing all of the electro-optic medium contained within the fiber. In addition, if a central conductive wire is used as the core strand, one can create switchable fibers where the fiber has the same color on all sides, which could be beneficial when weaving. By providing color changing fibers that display the same color on all sides with circular cross section, the fibers may be weaved without the concerns associated with rectangular fibers related to their twisting leading to diminished color quality of the final woven fabric.

From the foregoing, it will be seen that the present invention can provide color-changing fibers that can be integrated into textiles and other materials. The various embodiments of the invention allows one to make fabrics that are inherently breathable and flexible by weaving the color changing fibers. It is also possible to integrate these color changing fibers into a variety of other woven materials which can be used for interior design elements, architecture, wayfinding, etc. The fibers according to the various embodiments of the present invention may be used on standard looms and the manufacturing processes used to produce the fibers are easily scalable. Furthermore, the fibers have the potential to be independently addressed, and the electro-optic media applied to each thread may contain different formulations. As a result, fabrics made using the color-changing fibers described herein may use a plurality of different fibers. For example, one set of fibers may include an encapsulated electrophoretic media containing white and red pigments, a second set may include media containing white and green pigments, and a third set may include white and blue pigments. The fabric may be woven with the three sets of threads, such that the final configuration of the weave would allow the combination of any of the four colors in various switchable proportions and patterns to achieve a wide spectrum of selectable colors for the fabric. The electrophoretic media is not limited to two pigments. The encapsulated electrophoretic media may alternatively include three or more pigments and/or a colored dispersion fluid to allow for a potentially infinite number of optical combinations within the fabric, such as the electrophoretic media disclosed in U.S. Pat. No. 9,921,451. By using bistable electro-optic media, low power is required to switch the material and electronic controls used to switch the material may be detachable.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The contents of all of the aforementioned patents and applications are incorporated by reference herein in their entireties.

The invention claimed is:

1. A method of making a flexible color-changing fiber comprising:
    coating at least a portion of a surface of a conductive core strand with capsules including an electrophoretic medium to create a coated core strand;
    drying the capsules including an electrophoretic medium onto the surface of the conductive core strand to create a dried coated core strand;
    inserting the dried coated core strand through a preform comprising a conductive wire; and
    drawing down the preform to form a fiber comprising an annular wall, such that the conductive wire extends axially through the annular wall and the dried coated core strand extends axially through a central portion of the fiber.

2. The method of claim 1, wherein the electrophoretic medium comprises a non-polar solvent and two types of charged pigment particles, each type of charged pigment particles having a charge polarity and color different from the other.

* * * * *